United States Patent [19]

Halstead

[11] Patent Number: 4,861,229
[45] Date of Patent: Aug. 29, 1989

[54] CERAMIC-MATRIX COMPOSITE NOZZLE ASSEMBLY FOR A TURBINE ENGINE

[75] Inventor: Lawrence T. Halstead, Milford, Mich.

[73] Assignee: Williams International Corporation, Walled Lake, Mich.

[21] Appl. No.: 120,968

[22] Filed: Nov. 16, 1987

[51] Int. Cl.$^4$ .............................................. F01D 9/04
[52] U.S. Cl. ..................................... 415/138; 415/190
[58] Field of Search ............... 415/134, 137, 138, 139, 415/189, 190, 214, 216–218; 416/241 B; 501/90, 94, 95

[56] References Cited

U.S. PATENT DOCUMENTS

| | | | |
|---|---|---|---|
| 2,605,997 | 8/1952 | Lombard et al. | 415/138 |
| 2,894,318 | 7/1959 | Bloomberg | 415/216 X |
| 3,843,279 | 10/1974 | Crossley et al. | 415/138 X |
| 3,910,716 | 10/1975 | Roughgarden et al. | 415/138 X |
| 4,298,385 | 11/1981 | Claussen et al. | 501/94 X |
| 4,502,276 | 3/1985 | Pask | 415/138 X |
| 4,643,636 | 2/1987 | Libertini et al. | 415/138 |

FOREIGN PATENT DOCUMENTS 2831547 2/1979 Fed. Rep. of Germany ...... 415/214

*Primary Examiner*—Robert E. Garrett
*Assistant Examiner*—Joseph M. Pitko
*Attorney, Agent, or Firm*—Lyman R. Lyon

[57] ABSTRACT

A nozzle assembly for a turbine engine comprises an annular ceramic-matrix composite hub having integral radially outwardly extending vanes, and a pair of annular ceramic-matrix composite shrouds which interlockingly engage and secure the radially outermost ends of the vanes, whereby the hub is peripherally supported. The quasi-isotropic laminate structure of both hub and shroud materials generates like physical properties radially and circumferentially in the hub, and axially and circumferentially in the shrouds. Such quasi-isotropism in turn provides cooperative thermal expansion of the hub and shrouds during engine operation, whereby the radial, axial, and circumferential abutting surfaces of the ends of the vanes increasingly interlockingly engage with the correspondingly opposed surfaces of the shrouds to effect increased structural integrity of the nozzle assembly. The nozzle assembly is supported relative to the metallic engine mount therefor by a plurality of axially extending support beams circumferentially spaced about, and secured to, the periphery of the shrouds. The support beams accommodate the disparate radial thermal expansion between the ceramic and metallic components of the engine.

13 Claims, 2 Drawing Sheets

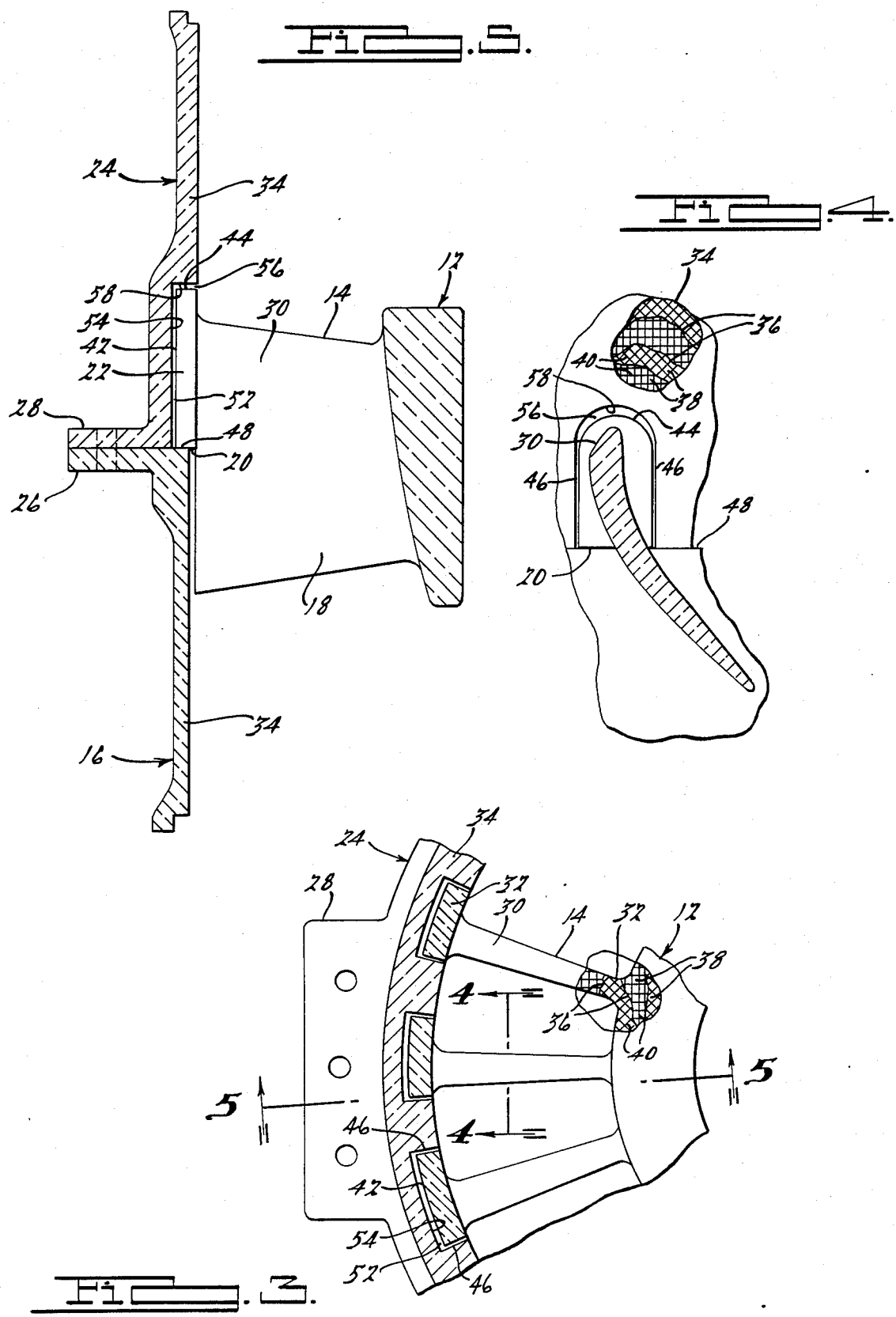

CERAMIC-MATRIX COMPOSITE NOZZLE ASSEMBLY FOR A TURBINE ENGINE

BACKGROUND OF THE INVENTION

It has long been recognized that reinforced ceramic engine components afford significant gains over like components fabricated from superalloys in such physical properties as high temperature strength and stiffness, and improved fatigue, creep, corrosion, and wear resistance. Unfortunately, as a practical matter, it is precisely these enhanced physical properties—particularly the significantly lower coefficient of thermal expansion (CTE) and higher operating temperature capability of ceramics over metals—that present the greatest impediment to the use of ceramics in an application such as a turbine engine nozzle.

Specifically, the primary difficulty encountered when incorporating reinforced ceramic nozzle components within a turbine engine lies in maintaining critical tolerances between the low-CTE, high operating temperature ceramic components and the relatively higher-CTE, lower operating temperature metallic structures of the engine. In an effort to overcome this problem, the prior art teaches the use of individual ceramic composite vanes installed between, and retained by, inner and outer rings formed either of ceramic or metallic material. However, close tolerance control of vane incidence angles and flowpath contours is particularly difficult, and the inner ring, or hub, requires additional supporting structures, as it cannot be supported by the vanes alone. The metallic inner supporting structures characteristically employed by the prior art must be cooled to prevent overheating, thereby limiting the advantages of the advanced material system while vastly increasing system complexity.

The disparity between the CTE of ceramics in relation to metals also presents difficulties in attaching a ceramic nozzle to the outer metallic structure of the engine. The prior art teaches the use of an annular, frusto-conical metallic support to attach a metal nozzle to the metallic structure of the engine. However, unacceptably large hoop stresses are developed in such a metallic support when utilized to support a ceramic nozzle. Indeed, the higher operating temperatures achievable with ceramics exacerbates the dimensional disparity between support and nozzle, thereby making the interface between the ceramics and metals even more problematical. Once again, the full potential of ceramics is not realized by the prior art.

SUMMARY OF THE INVENTION

A reinforced ceramic nozzle assembly for a turbine engine comprises an annular hub formed of a first reinforced ceramic material exhibiting quasiisotropism in a plane normal to the longitudinal axis of the hub, the hub being provided with radially outwardly extending vanes integral therewith; and a pair of annular cylindrical shrouds formed of a second reinforced ceramic material so as to exhibit quasiisotropic characteristics in all directions normal to a radial vector thereof, the shrouds encompassing the hub and having means disposed internally thereof for interlockingly engaging the radially outermost ends of the hub's vanes, whereby the hub is peripherally supported and retained.

The quasi-isotropism of the hub and shroud materials provides cooperative thermal expansion threbetween during engine operation so as to increasingly interlockingly engage the radially outermost ends of the vanes with the shrouds, thereby achieving superior structural integrity at higher operating temperatures. Moreover, the nozzle's vanes are positioned with greater accuracy, resulting in fewer leak paths while reducing nozzle weight and cooling requirements.

The reinforced ceramic nozzle assembly of the instant invention is mounted to the engine by a plurality of axially extending metallic support beams circumferentially spaced about, and secured to, the periphery of the shrouds thereof. The moment of inertia of the support beams in the radial direction is substantially less than the inertial moment thereof in the direction tangential thereto and, thus, the disparate thermal expansion of the ceramic nozzle and metallic engine components is accommodated by resilient longitudinal flexing of the beams while the nozzle is maintained in concentricity with the rotational axis of the engine, whereby weight is reduced and low dimensional tolerances are maintained.

BRIEF DESCRIPTION OF THE DR WINGS

FIG. 3 is an enlarged fractionated view in FIG. 2

FIG. 4 is an enlarged fractionated view in cross-section of a vane along line 4—4 of FIG. 3.

FIG. 5 is an enlarged fractionated view, partly in section and partly broken away, of the nozzle assembly along line 5—5 of FIG. 3.

DETAILED DESCRIPTION OF THE PREFERRED EMBODIMENT OF THE INVENTION

Figure 1:
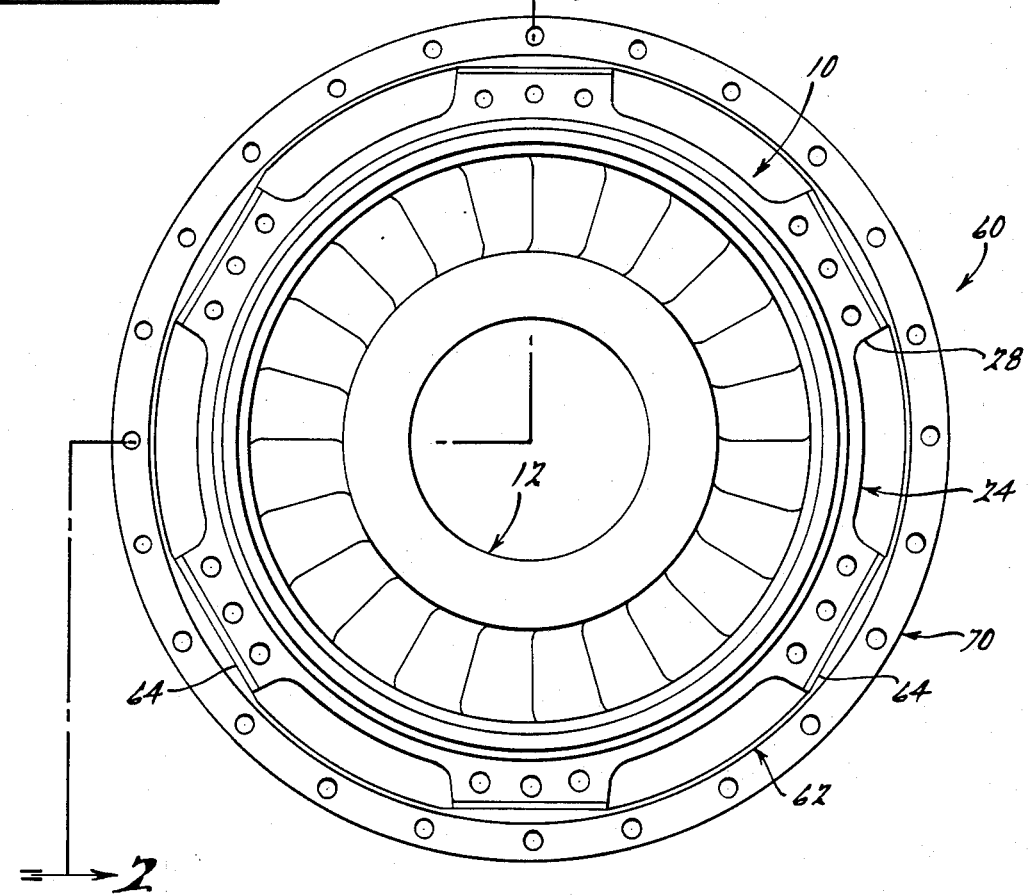
FIG. 1 is a plan view of a ceramic-matrix composite turbine nozzle constructed in accordance with the instant invention.
Figure 2:
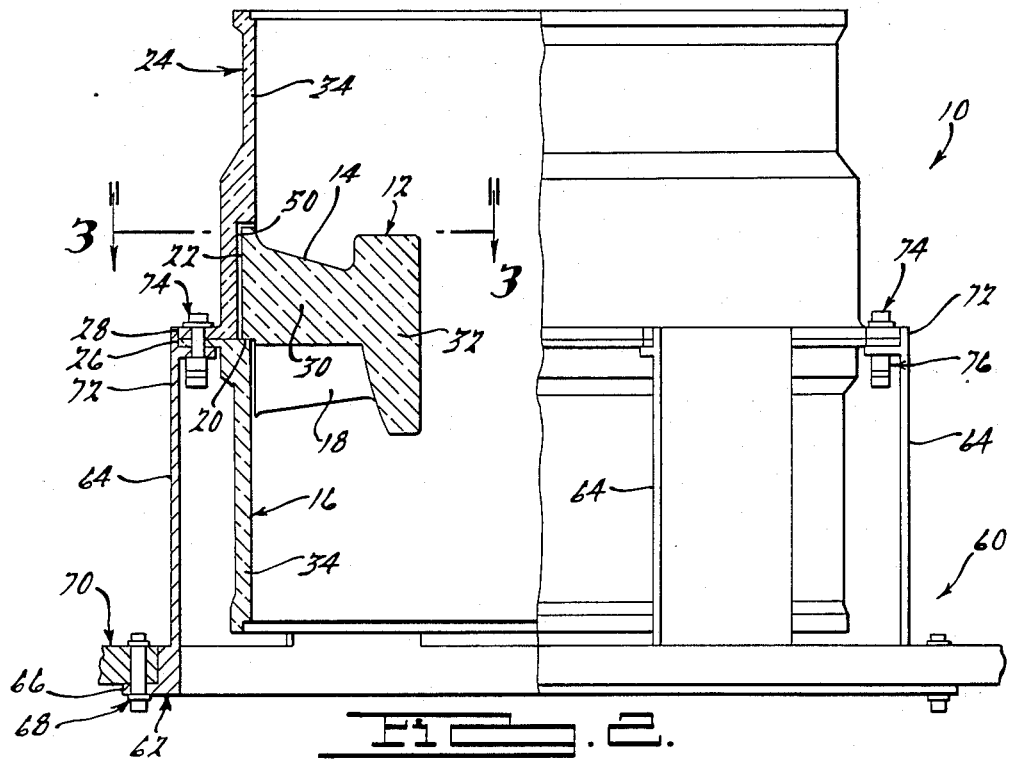
FIG. 2 is a side view, partially in section, of the nozzle assembly along line 2—2 of FIG. 1.

Referring to FIGS. 1 and 2, an exemplary embodiment of the reinforced ceramic nozzle assembly 10 of the instant invention is comprised of three quasiisotropic laminated ceramic-matrix composite components: a central hub 12 having a plurality of integral, radially outwardly extending vanes 14; a rear annular shroud 16 which encompasses the trailing portion 18 of the vanes 14 while engaging with a surface 20 on the radially outermost portion 22 thereof so as to prevent axially rearward movement of the hub 12: and a forward annular shroud 24 coupled with the rear shroud 16 as by complementary flanges 26 and 28 so as to encompass the leading portion 30 of the vanes 14 while interlockingly engaging with the ends 22 thereof, whereby eccentric, circumferential and axially forward movement of the hub 12 relative to the forward shroud 24 is prevented.

Referring to FIGS. 3 and 4, the quasiisotropic laminate structures of both hub and shroud materials 32 and 34, respectively, comprise a plurality of two-dimensional reinforcement-fibre layers 36 impregnated with a ceramic matrix material 38, e.g., layered carbon-fibre lattices impregnated with a silicon carbide matrix. The constituent ceramic matrix material 38 and reinforcement fibres 40 of the laminated materials 32 and 34 are selected so as to ensure substantially similar diametric thermal expansion of both hub and shrouds during engine operation.

Specifically, the hub 12 of the nozzle assembly 10 of the instant invention, including the vanes 14 thereof, is machined from a single block of laminate 32 comprised of several layers 36 of woven carbon fibres 40 impregnated with a silicon carbide matrix 38 in a CVD process. The resultant quasiisotropic laminate 32 produces physical properties in the axial, or cross-ply, direction thereof which differ markedly from the properties exhibited in all directions therein within a plane normal to the longitudinal axis of the hub 12. Thus, the hub's axial thermal expansion will greatly exceed both the radial and circumferential growth therein.

The radially outermost portion 22 of each vane 14 is provided with a plurality of surfaces 20, 42, 44, and 46 which are preferably of simple shape and as large as practicable while still allowing for tool access to form proper vane contours. The advantages of utilizing an arcuate forward vane end surface 44 will be more fully described below.

The material 34 for the shrouds 16 and 24 is shown in FIG. 4 as comprising a ceramic-matrix-impregnated reinforcement-fibre lattice 36 that is wrapped circumferentially to provide essentially isotropic behavior longitudinally and circumferentially therein, i.e., in all directions within the resultant annular cylindrical laminated material 34 normal to a radial vector thereof, with diverse, cross-ply behavior in the radial, or through-thickness, direction. Thus, the shrouds' radial thermal expansion will greatly exceed both the longitudinal and circumferential growth therein.

The rear shroud 16 encompasses the trailing portion 18 of the vanes 14, as shown in FIG. 5. The rearwardly disposed surface 20 of each vane end 22 abuts against the leading surface 48 of the rear shroud 16, thereby preventing the hub 12 from moving aft. The forward shroud 24 encompasses the leading portion 30 of the vanes 14, and is secured to the rear shroud 16 as by flanges 26 and 28 in a manner to be hereinafter described. Complementary grooves 50 are formed internally of the forward shroud 24 to accept and interlockingly engage with each individual vane end 22, preventing circumferetial and axially forward movement of the hub 12 while maintaining the hub 12 in concentricity therewith and providing a proper flowpath between the vanes 14.

The resultant, comparatively higher cross-ply, or radial, thermal expansion of the shrouds 16 and 24 with respect to the thermal growth thereof circumferentially and longitudinally tends to fill the gaps 52 between the radially outermost vane end surfaces 42 and the correspondingly opposed groove surfaces 54 of the forward shroud 24, making them tight at running conditions. Similarly, the high cross-ply, or longitudinal, thermal expansion of the hub 12, in comparison to the radial growth thereof, and to the longitudinal growth of the forward shroud 24, tends to fill the gaps 56 between the axially disposed surfaces 44 of the vane ends 22 and the correspondingly opposed groove surfaces 58 of the forward shroud 24, while maintaining the axially rearwardly disposed surface 20 of each vane end 22 in contiguity with the correspondingly opposed end surface 48 of the rear shroud 16. The use of arcuate mating surfaces 44 and 58, i.e., surfaces capable of exerting force circumferentially as well as axially, acts to center each vane end 22 circumferentially within its corresponding groove 50 during engine operation.

Thus, the low in-plane growth of the laminated materials 32 and 34 utilized by the instant invention and the lack of solid attachment between the vanes 14 and the shrouds 16 and 24 greatly reduces or eliminates the problem of thermal fight therebetween during engine transient conditions. Moreover, the vanes 14 are thus more accurately positioned within the shrouds 16 and 24.

Referring once again to FIGS. 1 and 2, an annular support structure 60 for the nozzle assembly 10 of the instant invention comprises an annular body portion 62 having a plurality of circumferentially spaced beams 64 extending axially therefrom. The annular body portion 62 is secured as by outer flange 66 thereof and conventional fasteners 68 to a complementary internal mounting flange 70 integral to the main engine structure (not shown). Since the support structure 60 is effectively a cone support that is slotted along its entire length, the deleterious hoop stresses characteristic of prior art support cones are avoided.

The beams 64 of the annular support structure 60 are formed of a high temperature nickel alloy such as Hastelloy-X. The beam thickness is selected so that the bending stresses experienced by the beams 64 during engine operation fall short of the material yield point at the maximum differential thermal expansion between the two ends of the beams 64, i.e., between the radial thermal expansion of the engine mount flange 70 and that of the shrouds 16 and 24. Moreover, each beam 64 is oriented so as to provide a substantially greater inertial moment in the plane tangential to the shrouds 16 and 24 than in the direction radially outwardly therefrom.

The free end 72 of each support beam 64 is secured to complementary shroud outer flanges 26 and 28 as by metallic threaded fasteners 74 with high thermal expansion spacers 76 to accommodate the lower circumferential thermal expansion of the ceramic-matrix composite flanges 26 and 28. A small amount of cooling air is directed at the flange group during engine operation to prevent the overheating of the metallic elements thereof.

The nozzle assembly 10 is maintained in concentricity with the engine mounting flange 70 by the resultant, relatively flat cross-section of the support beams 64 of the support structure 60, as the beams 64 are allowed to bend radially outwardly but not tangentially during engine operation and, hence, permit radially outward expansion of the nozzle assembly 10 while prohibiting lateral translation thereof relative to the engine mounting flange 70. Thus, for example, when a transverse load is applied to the nozzle assembly 10, the support beams 64 whose minimal axis in cross-section, or thickness direction, is coincident with the load path readily flex, and therefore provide little resistance to such a load. However, the support beams 64 whose thickness direction is not coincident with the load path provide a much greater inertial moment to react against the bending load, whereby the nozzle assembly 10 is maintained in concentricity with the engine mounting flange 70. The use of six circumferentially spaced beams 64 appear to provide optimal results.

It is to be noted that, while the preferred embodiment utilizes a laminate comprised of a plurality of layered two-dimensional reinforcement-fibre lattices impregnated with a ceramic-matrix material to generate a reinforced ceramic material exhibiting quasi-isotropic characteristics, the instant invention contemplates the use of other reinforcement means, such as the use of so-called "self-reinforcing" materials, whereby quasiisotropism therein is controllably achieved. Additionally, it is to be noted that the laminated materials 32 and 34 may be of like, or unlike, composition, provided that the hub 12 increasingly interlockingly engages with the shrouds 16 and 24 as the normal engine operating temperature is achieved.

While the preferred embodiment of the invention has been disclosed, it should be appreciated that the invention is susceptible of modification without departing from the spirit of the invention or the scope of the subjoined claims.

I claim:

1. A reinforced ceramic nozzle assembly for a turbine engine comprising an annular, right circular cylindrical hub formed of a first reinforced ceramic material so as to exhibit quasi-isotropic characteristics within a plane normal to the longitudinal axis of said hub, said hub having a plurality of integral radially outwardly extending vanes having leading and trailing edges, the radially outermost ends of said vanes nominally generating a right circular cylinder coaxial with said hub: and a first and second annular, right circular cylindrical shroud formed of a second reinforced ceramic material so as to exhibit quasi-isotropic characteristics in all directions therein normal to a radial vector thereof, an end of said first shroud being secured in contiguity with an end of said second shroud, at least one of said contiguous ends of said shrouds having a plurality of internal grooves extending axially therefrom, the radially outermost ends of said vanes being located generally within said grooves, said vane ends interlockingly engaging with said grooves upon cooperative thermal expansion of said hub and said shrouds, whereby relative axial and circumferential movement of said hub to said shrouds is prevented.

2. The nozzle assembly of claim 1 wherein said first and second reinforced ceramic materials are of like composition.

3. The nozzle assembly of claim 1 including resilient support means for mounting said nozzle assembly upon an annular engine structure and accommodating the disparate radial thermal expansion between said nozzle assembly and said annular engine structure, whereby said nozzle assembly and said annular engine structure are maintained in axial alignment.

4. The nozzle assembly of claim 3 wherein said resilient support means comprises plurality of generally axially extending beams having a moment of inertia in the radial direction significantly less than the moment of inertia in the direction tangential thereto, said beams being circumferentially spaced about said nozzle assembly, with an end of each of said beams being secured to one of said shrouds about the periphery thereof, the other end of said beams being secured to said annular engine structure.

5. In a turbine engine having an annular structure for mounting a nozzle thereon, a ceramic-matrix composite nozzle assembly comprising an annular, right circular cylindrical laminated composite hub formed of superposed planar reinforcement-fibre layers impregnated with a ceramic matrix material, the longitudinal axis of said hub being normal to said fibre layers, said hub having a plurality of integral radially outwardly extending vanes having leading and trailing edges, the radially outermost ends of said vanes nominally generating a right circular cylinder coaxial with said hub and having axial, radial, and circumferential abutting surfaces projecting therefrom;

a first annular, right circular cylindrical laminated composite shroud formed of concentric reinforcement-fibre layers impregnated with a ceramic matrix material, the fibres and matrix being of like composition as said hub, an end of said first shroud having an axially disposed surface abutting against the trailing-edge axial abutting surfaces of said vanes; and a second annular, right circular cylindrical laminated composite shroud formed of concentric reinforcement-fibre layers impregnated with a ceramic matrix material, the fibres and matrix being of like composition as said first shroud, an end of said second shroud having a plurality of internal grooves extending axially therefrom, the surfaces of said grooves abutting the radial, circumferential, and leading-edge axial abutting surfaces of said vanes upon thermal expansion thereof, the end of said second shroud being joined with the end of said first shroud, whereby relative axial and circumferential movement of said hub to said shrouds is prevented.

6. The nozzle assembly of claim 5 wherein the fibres and matrix of said hub and said shrouds are of like composition.

7. The nozzle assembly of claim 5 wherein the substantially concentric reinforcement fibre layers of said laminated ceramic shrouds comprise a two-dimensional reinforcement fibre lattice circumferentially wrapped to achieve an annular, right circular cylinder.

8. The nozzle assembly of claim 5 including resilient support means mounted upon said annular engine structure for accommodating the disparate radial thermal expansion between said nozzle assembly and said annular engine structure, whereby said nozzle assembly is maintained in axial alignment with said annular engine structure.

9. The nozzle assembly of claim 8 wherein said resilient support means comprises a plurality of axially extending beams having a radial inertial moment significantly less than the moment of inertia tangentially thereof, said beams being circumferentially spaced about said nozzle assembly, with an end of each of said beams being secured to one of said shrouds about the periphery thereof, the other end of said beams being secured to said annular engine structure.

10. The nozzle assembly of claim 9 wherein said resilient support means comprises six generally axially extending support beams.

11. The nozzle assembly of claim 5 wherein one of said shrouds has a radially outwardly extending flange to facilitate the joining together of said shroud with the other of said shrouds.

12. The nozzle assembly of claim 8 wherein one of said shrouds has a radially outwardly extending flange to facilitate the joining of said support means thereto.

13. The nozzle assembly of claim 5 wherein an abutting surface projecting from the radially outer end of each of said vanes is of arcuate configuration.

* * * * *